April 20, 1965 ISATO KOSHOBU 3,179,066
TRANSMISSION AND BRAKING CONTROL FOR VEHICLES
HAVING BOTH ROAD AND RAIL WHEELS
Filed June 27, 1961 2 Sheets-Sheet 1

INVENTOR.
Isato Koshobu
BY
ATTORNEYS

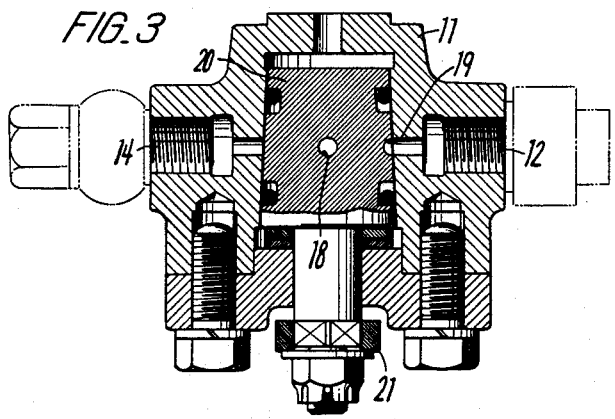
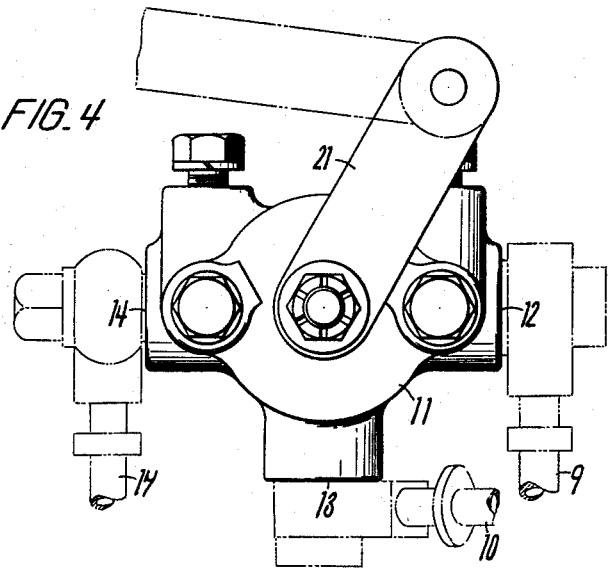
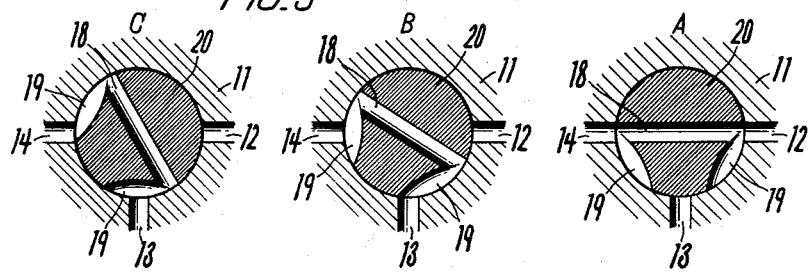
INVENTOR.
Isato Koshobu
BY
ATTORNEYS

United States Patent Office 3,179,066
Patented Apr. 20, 1965

3,179,066
TRANSMISSION AND BRAKING CONTROL FOR VEHICLES HAVING BOTH ROAD AND RAIL WHEELS
Isato Koshobu, Hondori, Kure, Japan, assignor to Toyo Kogyo Company Limited, Aki-gun, Hiroshima-ken, Japan
Filed June 27, 1961, Ser. No. 120,075
Claims priority, application Japan, July 7, 1960, 35/30,740
4 Claims. (Cl. 105—215)

The invention relates to improvements in driving and braking apparatus for a vehicle and more particularly to a regulating driving and braking device installed in a vehicle having both road wheels and rail wheels side by side and which are in different wheel systems.

It is an object of the invention to provide a vehicle of the character described with novel devices to regulate the operation of the vehicle so as to drive or to brake only the rail wheels or the road wheels.

Another object of the invention is to provide a construction of the vehicle of the character described, particularly its driving and braking systems, which is not complicated, and by which an accurate and efficient operation and also economical operation of such a peculiar vehicle can be obtained.

Further objects and advantages of the invention will be apparent from the following description.

Referring to the drawings which illustrate a preferred embodiment of the invention:

FIG. 3 is an enlarged central cross sectional view illustrating a valve member construction.

FIG. 4 is a side-elevational view of the same.

Figure 1:
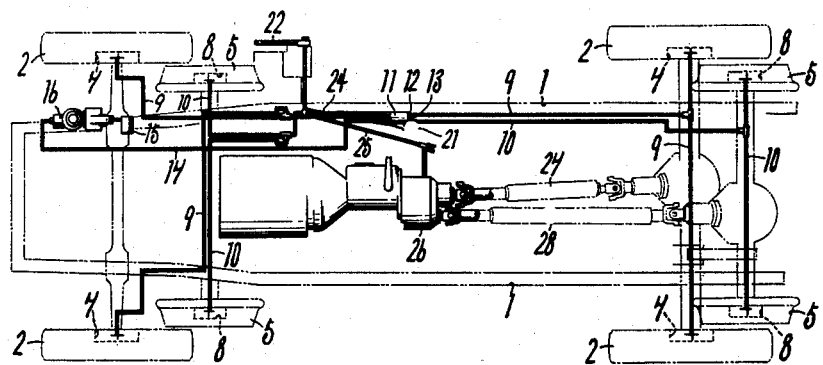
FIG. 1 is a plain view of the chassis of a vehicle with a regulating device constructed according to this invention.

FIGS. 5A–C are representations of positions of the valve within a valve housing.

The vehicle of the character described has road wheels 2 mounted on the frame 1, hoists 3 hydraulically or pneumatically operated and mounted on the frame 1, bell cranks 4 rotatably mounted preferably on the frame or axle or axle casing of the road wheels 2 and connected to the ends of the said hoists 3 at their upper ends, and rail wheels 5 mounted on other ends of the said bell cranks 4. Such a vehicle will be adaptable for driving both on roadways and railways by lifting up the rail wheels 5 higher than the road wheels 2, or lowering the rail wheels 5 so they can run on the rails 6 depending on which type of operation is desired. The operation of raising or lowering the rail wheels 5 will be executed by expanding or contracting the hoists 3 and subsequent swinging movement of the bell cranks 4.

In the vehicle above described, the present invention is in a means for regulating the driving and braking of different wheels in the systems.

Now referring to the drawings, the brake fluid conduits 9 branch forth from the port 12 of the changeover valve housing 11 and extend to each wheel cylinder 7 which act under pressure to brake road wheels 2. The brake fluid conduits 10 branch forth from port 13 of the valve housing 11 and extend to each wheel cylinder 8 which act under pressure to brake rail wheels 5. The foot pedal 15 operates the master cylinder 16 to feed brake fluid under pressure. Said master cylinder 16 is connected with the port 14 of the valve housing 11 through the brake fluid conduit 17. The valve body 20 having the central transverse bore 18 and surface grooves 19 is rotatably and fluid-tightly mounted within the valve housing 11. An axle is provided on the valve body 20 and it extends through housing 11 and is connected with the arm 21. Said arm 21 is articulated to a control lever 22 by rods 23 and 24. An additional rod 25 is connected between the rod 23 and a two way transmission 26. Said transmission 26 is provided with a gear member which will gear with the drive shaft 27 or 28, the drive shaft 27 driving the road wheels 2 through a differential and a rear axle, and the drive shaft 28 driving the rail wheels 5 through a differential and a rear axle.

The swinging movement of the control lever 22 within the necessary pre-determined range causes relative movements of the articulated connecting rods 21, 23 and 24, and subsequently causes the valve body 20 to rotate. The swinging range of the control lever 22 will be specifically arranged in accordance with the necessary rotation of the valve body 20. Said swinging movement of the control lever 22 also causes the additional rod 25 to move, so that the gear member of the two way transmission 26 will be thrown in gear with either the drive shaft 27 or 28.

Figure 2:
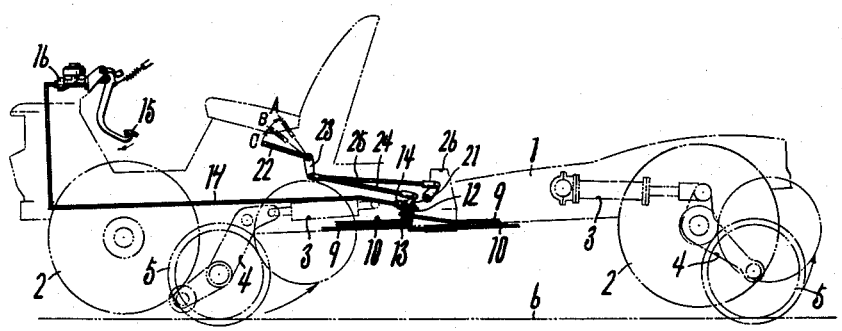
FIG. 2 is a side-elevational view of the same.

When it is desired to drive the vehicle provided with this invention on the roadways, the lever 22 is shifted to the pre-determined position as indicated with "A" in FIG. 2 for instance, then the valve body 20 will rotate under the action of the articulated rods 21, 23 and 24, and will be adjusted to the position as shown in FIG. 5–A, and the port 12 will communicate with the diametrically opposite port 14 through the central transverse bore 18. Thus the braking pressure applied to the brake fluid by the master cylinder 16 will be allowed to work upon the road wheels 2 through the ports 12 and 14, the bore 18, the brake fluid conduits 9 and 17 and each wheel cylinder 7. In this case, the valve body 20 will cut off the communication to the port 13 midway between the other ports, and accordingly, the brake fluid conduits 10 and all wheel cylinders 8 for the rail wheels will be isolated from braking pressure. At the same time, the additional rod 25 also will move in accordance with above described shifting of the lever 22 and cause the gear member of the two way transmission device 26 to drive the drive shaft 27. The drive shaft 28 will not be coupled with the transmission device 26, and only road wheels 2 will be driven through the drive shaft 27. In such arrangement the rail wheels 5 will be lifted up above the road wheels by means of the hoists 3 and the bell cranks 4.

Upon changing over the wheels to drive the vehicle on the railways, the lever 22 will shift and be positioned at a pre-determined middle point as indicated by "B" in FIG. 2 for instance, and the relative movements of the articulated rods 21, 23 and 24 will cause the valve body 20 to rotate and take the position as shown in FIG. 5–B. Then the port 13 will communicate with the port 14 through the central bore 18 and grooves 19, and the braking pressure supplied from the master cylinder 16 will be transmitted to rail wheels 5 through ports 13 and 14, the bore 18 and groove 19, the brake fluid conduits 10 and 17 and the wheel cylinders 8. In this case, the valve body 20 will cut off communication between the port 12 and other ports, and accordingly, the brake fluid conduit 9 and all wheel cylinders 7 will be isolated from the master cylinder. At the same time, the rod 25 will cause the gear member of the transmission device 26 to disengage from the drive shaft 27 and to engage with the drive shaft 28, so that the engine power will be transmitted only to the rail wheels 5 through the drive shaft 28. The rail wheels 5 will be lowered onto the rails during this arrangement by means of the hoists 3 and the bell cranks 4.

When the lever 22 shifts to the position as indicated by "C" in FIG. 2 for instance, relative movements of the rods 21, 23 and 24 cause the valve body 20 to rotate to the position as shown in FIG. 5–C, in which the valve body 20 still provides communication between the port 13 and the port 14 allowing braking pressure to work upon only rail wheels 5. At the same time, the rod 25 works to change gearing of the transmission device 26 to the drive shaft 28 to drive the rail wheels 5 in the reverse direction.

The foregoing descriptions are of only three of the most practical embodiments, and it should be understood that the invention is not limited to the embodiments herein described as various operating modes and constructional forms may be adapted within the scope of the appended claims.

It will be apparent from the foregoing that the device of this invention regulates driving and braking of multiple wheels provided in various wheel systems of the vehicle of character described, so as to drive and brake those wheels selectively and independently with a single engine and a single master cylinder and its single foot pedal. This also will avoid wasting of power during driving and brakings and prevent the described vehicle from tending to be complicated in its construction, and will meet demanding economical requirements. And furthermore, as both operations of the driving and braking apparatus are regulated simultaneously by a single control lever means arranging the vehicle for running either on roadways or on railways will be executed without complicated operations.

What I claim:

1. In a vehicle having road wheels and rail wheels and drive means, the combination of a two way transmission adapted to alternately connect the drive means to the road wheels or the rail wheels, a braking system comprising a single master braking cylinder, a braking cylinder at each wheel, a changeover valve having at least two positions, first brake fluid conduits connecting each braking cylinder for the road wheels to one part of said changeover valve, further brake fluid conduits connecting each braking cylinder for the rail wheels to another part of said changeover valve, and a master cylinder conduit connecting said master cylinder to said valve, and a control lever means for said braking system and said transmission and coupled to said transmission and to said valve and movable to at least two positions in the first of which said transmission means connects said drive means to said road wheels and said valve is moved to connect said master cylinder conduit to said first brake fluid conduits and in the second of which said transmission means connects said drive means to said rail wheels and said valve is moved to connect said master cylinder conduit to said further brake fluid conduits.

2. The combination as claimed in claim 1 in which said changeover valve is movable to three positions, said two way transmission having two positions when it connects said drive means to said rail wheels, a forward and a reverse position, and said control lever means being movable to three positions, in the first of which said transmission means connects said drive means to said road wheels and said valve is moved to connect said master cylinder conduit to said first brake fluid conduits, and in the second of which said transmission means connects said drive means to said rail wheels for forward drive and said valve is moved to connect said master cylinder conduit to said further brake fluid conduit, and in the third of which said transmission connects said drive means to said rail wheels for reverse drive and said valve is moved to connect said master cylinder conduit to said further brake fluid conduit.

3. In a vehicle having road wheels and rail wheels and having a drive means and a two way transmission means for alternately connecting the drive means to the road wheels or the rail wheels, the combination of a braking system comprising a single master braking cylinder, a braking cylinder at each wheel, a changeover valve having at least two positions, first brake fluid conduits connecting each braking cylinder for the road wheels to one part of said changeover valve, further brake fluid conduits connecting each braking cylinder for the rail wheels to another part of said changeover valve, and a master cylinder conduit connecting said master cylinder to said valve, and a control lever means for said braking system and said transmission and coupled to said valve and adapted to be connected to said two way transmission means and movable to at least two positions in the first of which said transmission means connects said drive means to said road wheels and said valve is moved to connect said master cylinder conduit to said first brake fluid conduits and in the second of which said transmission means connects said drive means to said rail wheels and said valve is moved to connect said master cylinder conduit to said further brake fluid conduits.

4. The combination as claimed in claim 2 in which said changeover valve comprises a housing having a chamber therein, a valve body sealingly rotatably mounted in said chamber, said valve body having a bore therethrough extending through the axis of rotation of said valve body, a groove along the surface of said valve body at each end of said bore, said grooves extending from the ends of said bore toward each other along the surface of said valve body for only a part of the circumference thereof and terminating at points spaced from each other along the surface of said valve body, said master cylinder and said first braking conduits opening into said chamber at diametrally opposite points thereof, and said further braking fluid conduits opening into said chamber at a point substantially midway between said diametrally opposite points, whereby in a first position of said valve body with said bore between said diametrally opposite points said master cylinder conduit and said first braking fluid conduits are in communication and said further braking fluid conduits are blocked off, and in a second and third position of said valve body, said bore is at an angle to the line between said diametrally opposite points and said grooves bring said master cylinder conduit and said further conduits into communication through said bore and said first braking fluid conduits are blocked off.

References Cited by the Examiner
UNITED STATES PATENTS

| | | | |
|---|---|---|---|
| 2,328,606 | 9/43 | Boldt | 303—6 |
| 2,464,039 | 3/49 | Howell. | |
| 2,466,837 | 4/49 | Bohr | 188—152.16 |
| 2,478,647 | 8/49 | Watts et al. | 105—215 |
| 2,861,843 | 11/58 | Bentz et al. | 303—26 |
| 2,889,785 | 6/59 | Browne | 105—215 |

ARTHUR L. LA POINT, *Primary Examiner.*
A. JOSEPH GOLDBERG, EUGENE A. BOTZ,
*Examiners.*